United States Patent
Giamanco et al.

(10) Patent No.: US 9,381,932 B1
(45) Date of Patent: Jul. 5, 2016

(54) PORTABLE, MOUNTABLE CASE FOR WHEELED LUGGAGE AND ROLLING TOOL BAGS

(71) Applicants: Jerry R. Giamanco, Bayside, NY (US); Kenneth Campanelli, Huntington, NY (US); Vincent Antonellis, Massapequa, NY (US)

(72) Inventors: Jerry R. Giamanco, Bayside, NY (US); Kenneth Campanelli, Huntington, NY (US); Vincent Antonellis, Massapequa, NY (US)

( * ) Notice: Subject to any disclaimer, the term of this patent is extended or adjusted under 35 U.S.C. 154(b) by 73 days.

(21) Appl. No.: 14/544,106

(22) Filed: Nov. 25, 2014

Related U.S. Application Data (60) Provisional application No. 61/963,250, filed on Nov. 27, 2013.

(51) Int. Cl.
| A45C 5/14 | (2006.01) |
| B62B 5/00 | (2006.01) |
| A45C 13/00 | (2006.01) |
| B23P 19/00 | (2006.01) |

(52) U.S. Cl.
CPC . *B62B 5/00* (2013.01); *A45C 13/00* (2013.01); *B23P 19/00* (2013.01)

(58) Field of Classification Search
CPC .......... B62B 5/00; B62B 1/002; A45C 13/00; A45C 5/14; B23P 19/00; A47B 23/042
See application file for complete search history.

(56) References Cited

U.S. PATENT DOCUMENTS

| 337,143 A | 3/1886 | Foster |
| 3,301,619 A | 1/1967 | Mead |
| 3,436,093 A | 4/1969 | Ruffley, Jr. |
| 3,936,026 A * | 2/1976 | Hampel ................ F16M 11/08 174/70 R |
| 4,356,854 A | 11/1982 | McGee |
| 4,488,497 A | 12/1984 | Bevans |
| 4,729,535 A | 3/1988 | Frazier et al. |
| 4,765,472 A | 8/1988 | Dent |
| 4,773,535 A | 9/1988 | Cook |
| 4,826,059 A | 5/1989 | Bosch et al. |
| 4,984,906 A | 1/1991 | Little |
| 4,993,551 A | 2/1991 | Lindsay |
| 5,139,143 A | 8/1992 | Pond |
| 5,174,447 A | 12/1992 | Fleming |
| 5,437,367 A | 8/1995 | Martin |
| 5,529,322 A | 6/1996 | Barton |
| 5,547,080 A | 8/1996 | Klimas |
| 5,639,003 A | 6/1997 | Utzinger, III |
| 5,653,337 A | 8/1997 | Cirigliano |
| D388,919 S | 1/1998 | Maire et al. |
| D397,229 S | 8/1998 | Winters et al. |
| 5,893,572 A | 4/1999 | Parks |
| D410,551 S | 6/1999 | Guimont et al. |
| 5,961,134 A | 10/1999 | Congleton et al. |
| 5,971,101 A | 10/1999 | Taggart |
| 5,988,383 A | 11/1999 | Armstrong |
| 6,105,508 A | 8/2000 | Ryburg |
| D431,019 S | 9/2000 | Richter |
| 6,113,050 A * | 9/2000 | Rush .................... A47B 23/042 248/346.01 |

(Continued)

*Primary Examiner* — Brian D Nash
(74) *Attorney, Agent, or Firm* — Alfred M Walker

(57) ABSTRACT

The present invention provides a portable, mountable utility case that mounts on top of, and, in combination with, the handle of wheeled luggage, rolling tool bags and hand trucks for anyone who requires a portable work station. The portable utility case mounts to the top of the handle of the vertical, telescopic or non-telescopic support members of wheeled luggage, rolling tool bags and hand trucks and secured to the handle by means of an integral, mechanical clamping device. The universal design of the mechanical clamping device can accommodate handles of varying widths and thicknesses.

19 Claims, 12 Drawing Sheets

(56) References Cited

U.S. PATENT DOCUMENTS

| | | |
|---|---|---|
| 6,152,300 A | 11/2000 | Perkins |
| 6,203,053 B1 | 3/2001 | Sohrt et al. |
| 6,267,277 B1 | 7/2001 | Taylor |
| 6,305,498 B1 | 10/2001 | Itzkovitch |
| 6,398,235 B1 | 6/2002 | Cary |
| 6,435,304 B1 | 8/2002 | Stierle |
| 6,439,134 B1 | 8/2002 | Ryburg |
| 6,499,713 B1 | 12/2002 | Paoluccio |
| 6,578,708 B2 | 6/2003 | Barnett |
| 6,604,472 B2 | 8/2003 | McNeil |
| 6,736,073 B2 | 5/2004 | Ryburg |
| 6,920,667 B2 | 7/2005 | Joesten |
| 7,055,652 B1 | 6/2006 | Williams |
| 7,195,119 B2 | 3/2007 | Lungo |
| 7,261,212 B2 | 8/2007 | Sholem |
| 7,431,313 B1 | 10/2008 | Torres et al. |
| 7,503,569 B2 | 3/2009 | Duvigneau |
| 7,661,685 B2 | 2/2010 | Thibault |
| 7,748,584 B2 | 7/2010 | Easom |
| 7,766,161 B2 | 8/2010 | Good |
| 7,934,596 B1 | 5/2011 | Aycock |
| 7,946,609 B2 | 5/2011 | Johnson et al. |
| 7,950,335 B1 | 5/2011 | Almond et al. |
| 7,987,955 B2 | 8/2011 | Puchalski |
| 8,127,690 B2 | 3/2012 | Baughman |
| 8,146,722 B1 * | 4/2012 | Moreno ............... A45C 5/14 190/115 |
| D689,282 S | 9/2013 | Lindeman |
| 8,544,141 B1 | 10/2013 | Kyde et al. |
| 8,662,300 B1 | 3/2014 | Arena |
| 9,146,584 B2 * | 9/2015 | Bowles ............... G06F 1/1613 |
| 9,277,796 B1 * | 3/2016 | Elam .................. A47C 9/00 |
| 2002/0041084 A1 * | 4/2002 | Darling, III ......... B62B 1/002 280/652 |
| 2003/0227148 A1 | 12/2003 | Shipman et al. |
| 2006/0144732 A1 | 7/2006 | Kaplan et al. |
| 2007/0039986 A1 | 2/2007 | Tomasi |
| 2009/0272779 A1 | 11/2009 | Vu |
| 2014/0283631 A1 | 9/2014 | Guirlinger |

\* cited by examiner

PORTABLE, MOUNTABLE CASE FOR WHEELED LUGGAGE AND ROLLING TOOL BAGS

RELATED APPLICATIONS

This application claims benefit and priority of provisional application Ser. No. 61/963,250 filed on Nov. 27, 2013 under 35 U.S.C. §119(e), which application is incorporated by reference herein.

FIELD OF THE INVENTION

The present invention pertains to an apparatus that provides a portable work station that mounts on top of the handle of wheeled luggage, rolling tool bags, hand trucks and any similar equipment. The universal clamp design allows the apparatus to be secured atop most handles attached to the vertical extensible or non-extensible support members. The telescopic, extensible feature of the vertical support members can be adjusted to provide a convenient working height.

BACKGROUND OF THE INVENTION

There are existing luggage work surfaces that mount to the extensible telescopic handle with a variety of designs. U.S. Design Pat. No. Des. 431,019, Inventor: Herbert Richter, provides a laptop table that hangs from a steering wheel. This support design differs from the present invention in that the table hangs from the top of a steering wheel. The action of the support member to rotate is counterbalanced by the lower extremity of the support member against the lower portion of the steering wheel. The difference of the present invention is that it is vertically supported atop the handle.

Other inventions include mounting devices that attach to the vertical extensible telescopic support members. For example: Work Surface for Luggage and Luggage Carrier: U.S. Pat. No. 6,105,508 issued Aug. 22, 2000, Inventor: Ryburg. U.S. Pat. No. 6,439,134B1 issued Aug. 27, 2002 Inventor: Ryburg. Work Surface for Luggage and Luggage Carrier: U.S. Pat. No. 6,736,073B2 issued May 18, 2004, Inventor: Ryburg. The embodiments of these patents rely on a cantilevered support attached to the vertical extensible telescopic handle support members with an integral support leg. The present invention differs in that it is mounted on top of the vertical extensible support member handle, which extends into a closed end cavity extending upward from the bottom of closeable container case of the portable work station.

U.S. Pat. No. 3,301,619, Utility Box, issued Jan. 14, 1965, Inventor: Sterling G. Mead shows a utility box mounted atop the rail of a boat. The utility box hangs from an external support member. The tendency of the utility box to rotate is counterbalanced by the lower extremity of the utility box against the lower portion of the utility box. The present invention differs in that it is vertically supported atop the handle.

U.S. Pat. No. 5,961,134, issued Oct. 5, 1999, Inventor Congleton, et al., discloses a pivotable flat shelf having pivot arms pivoting up to move the vertically oriented flat shelf to a horizontal position atop the telescopic handle. However, the flat shelf of Congleton does not have an upwardly extending closed cavity into which a telescopic handle extends, as in the container case of the present invention.

U.S. Pat. No. 4,356,854 issued Nov. 2, 2012, inventor McGee discloses a tool carrying pouch, which has a downwardly extending flexible skirt descending from the peripheral edge of the tool carrying pouch. However, McGee's pouch does not have a closed ended recess cavity extending upward in a container, into which closed ended recess cavity a telescopic handle extends as in the present invention.

OBJECTS OF THE INVENTION

The object of the present invention provides a portable work station that mounts on top of, and, in combination with, a handle of vertical, extensible, telescopic members of wheeled luggage, rolling tool bags, hand trucks and similar. This apparatus provides a removable, portable case and work surface which can also be separately carried. The case contains a recessed cavity that contains a compressive clamping device which mounts on top of the luggage handle. The clamping forces are distributed throughout the recessed cavity and transmitted to the case. In its preferred embodiment, the weight load of the case and its contents is substantially vertical on the extensible telescopic and non-telescopic support members with minimal cantilever effect.

Other objects will become apparent from the description of the present invention.

SUMMARY OF THE INVENTION

As the mobility of travelers and professionals increases, the availability of seating areas at passenger terminals and stations is constrained. The present invention provides a portable, temporary work station for business travelers where there is no convenient seating or table facilities available. For example, this invention can be used as a temporary work surface for portable electronics such as a laptop, tablet computer, (such as, for example, an iPad®), cell phones, etc., as well as a surface to place food and drink, documents and similar while waiting for a train, bus or plane, etc.

The work surface with a hinged cover provides a closable case that can contain supplies, devices, documents and instruments. This work case, while mounted atop a luggage handle, can also be used by traveling parents as a food or play surface for their children.

When the closed case is unclamped and removed from the top of the handle, it can then be attached to the vertical extensible telescopic members and placed atop the bag in its travel position. This is accomplished by sliding the strap fastened to the exterior of the case over the handle and slid down the vertical extensible members until the case rests on top of the luggage bag or tool bag. The case can also be removed and carried as a separate brief case with its carrying handle.

The present invention also provides a portable work surface and case for any mobile service providers and mobile professionals such as technicians, mechanics, automotive technicians and mechanics, students, photographers, carpenters, electricians, plumbers, artists, health care providers, facility and power plant workers, hair stylists, animal care providers and similar for anyone who uses wheeled luggage, rolling tool bags or hand trucks. The present invention provides a convenient work surface and case for these individuals who wheel their bags to a job location but do not have a convenient work surface to work from.

This invention also provides a portable work surface in the field, as well as a case that can be used to store supplies, tools and instruments. Users of the present invention can use the case to lay down tools and parts instead of laying them down on surrounding areas where they have a tendency to be misplaced. Parts and tools are less likely to be lost because the parts and tools that are placed on the work station while performing their work remain stored in the portable case for departure from the worksite.

Location of the work surface on top of the telescopic handle provides the user with a convenient working height to avoid bending down. The working height is adjustable by extending or retracting the vertical extensible telescopic members.

The object of the present invention provides a portable work station that mounts on top of a handle that is supported by vertical, extensible telescopic members of wheeled luggage, rolling tool bags, hand trucks and similar. This apparatus provides a removable, portable case and work surface.

The apparatus attaches to the handle of wheeled equipment such as wheeled luggage, rolling tool bags and hand trucks but is not limited to wheeled equipment. Since the present invention consists of a case with a cover, it provides additional storage capacity to existing wheeled and non-wheeled equipment.

The present invention is intended for use as example, but not limited to: power plant workers, land surveyors, locksmiths, field engineers, business travelers, family travelers, facility workers, hairstylists, maintenance workers and anyone who requires a mobile, portable work surface and case that attaches to wheeled luggage, rolling tool bags and hand trucks. The vertical, telescopic extensible members provide a flexible working height for the work surface, standing or sitting.

The work station consists of a case with a cover that also serves as an external work surface. A removable, internal work surface can also be included inside the case to cover personal items, tools, parts and other stored items. The work station is mounted on top of the telescopic handle and secured to the handle with a clamping mechanism that is recessed into the bottom of the case. The top surface of the case is a hinged cover that can be used as work surface. There is an additional, removable work surface inside the case to provide a flat working surface inside the case. This removable work surface also serves to contain any items stored underneath in the case.

The clamping mechanism consists of a knob attached to a threaded rod that advances and retracts the clamping force of the movable jaw plate. The threaded rod mechanically transmits the clamping force to a threaded nut or threaded insert integral to the case. The opposing clamp surface is integral to the case body. The case material can be manufactured from, but not limited to, a thermoset or thermoplastic, wood, metal or combinations thereof.

According to the present invention, the foregoing and other objects are attained by providing a removable, portable case and work surface. This work station is solely supported by the telescopic support members without any external supports.

In summary, the portable work station is used in combination with a mobile device having an upwardly extensible member with a horizontally extending handle member at a top end thereof for directing and controlling movement of the mobile device. The portable work station includes a housing with an interior formed by a flat bottom, side walls and a cover adapted to be opened, wherein the cover, when closed, forms an outer work surface. A cavity receptacle is provided within the interior of the work station.

The flat bottom of the housing has an opening in communication with the cavity receptacle and is adapted to receive the handle member of the upwardly extensible member, when the work station is deployed on the handle of the extensible member, the work station is removable from the handle member and the extensible member for storage or transport. A clamping apparatus clamps the handle member within the preferably closed ended cavity receptacle for allowing the work station to be employed while mounted on the extensible member.

The receptacle preferably includes a stationary side wall spaced from a movable jaw plate, wherein the handle member is clamped between the stationary side wall and movable jaw plate during deployment on the extensible member of the mobile device for use.

Optionally, the clamping apparatus includes a threaded adjustment screw having one end thereof connected to the movable side wall of the receptacle and an opposite end thereof having an adjustment knob, wherein the adjustment screw is threaded through a side wall of the housing for clamping the handle member within the cavity receptacle.

Optionally, the housing has a removable false bottom covering the cavity receptacle, whereby an upper side of the false bottom forms an interior work surface for a computer or similar device.

Optionally also, the cover is hinged with a detachable restraint to allow an inner surface of the cover, when opened to form an additional work surface.

Optionally, the mobile device includes a luggage with wheels, wherein the extensible member is retractable into the luggage, or other container, such as a tool container. The tool container may be a tool box with wheels, wherein the extensible member is retractable into the tool box and whereby deployment of the work station on the handle member allows a user to have frequently used tools within the work station for easier access at a jobsite.

In use, the method of forming and using a portable work station includes the steps of a) using a horizontally extending handle member located at a top end of an extensible member extending from a mobile device for directing and controlling movement of the mobile device;

b) mounting a work station case on the handle member when the extensible member is extended, wherein the work station case includes a housing with an interior formed by a flat bottom, side walls and a cover adapted to be opened, so that the cover when closed, forms an outer work surface, a cavity receptacle within the interior, and the flat bottom having an opening in communication with the cavity receptacle receiving the handle member, when the work station case is deployed on the extensible member, and over the cavity receptacle;

c) clamping the handle member within the receptacle for allowing the work station case to be employed while mounted on the extensible member; and c) removing the work station case from the handle member and retracting the extensible member for storage or transport of the work station case and/or the mobile device.

The method also optionally includes providing a false bottom within the housing above and covering the cavity receptacle, whereby an upper side of the false bottom forms an interior work surface for a computer or similar device.

The method also optionally includes providing the cover as a hingeable cover with a detachable restraint, to allow an inner surface of the cover, when opened, to form an additional work surface.

The objects and features of the present invention are set forth within. The mounting of the present invention set forth within is similar for all applications on wheeled luggage, rolling tool bags and hand trucks. Throughout the following discussion reference numerals have the meaning in the following list. This list is provided to facilitate understanding of the drawings.

BRIEF DESCRIPTION OF THE DRAWINGS

The present invention can best be understood in connection with the accompanying drawings. It is noted that the invention is not limited to the precise embodiments shown in drawings, in which.

LIST OF REFERENCE NUMERALS FOR ITEMS

10. Base Tray Utility Case with Clamp Mechanism Cavity
11 Closed Ended Receptacle Cavity for Insertion of Handle therein
12. Cover with Optional Hinge
13. Removable Interior Work Surface
15. Latch-Velcro or mechanical fastener
16. Interior Work Surface Removal Tabs
17. Carry Handle/Restraining Strap
18. Restraining Strap
19. Implement Holding Sleeves
20. Sub compartment Storage Unit
21. Soft Exterior Cover
22. Linear Edge Cushions of Soft Exterior Cover
23. Hard Cover
24. Adjustment Knob
25. Threaded Adjustment Screw
26. Swivel Head
27. Moving Jaw Plate
28. Stationary Clamp Wall
29. Non-slip Pad—Compressible
42. Threaded Insert
102. Cover Restraint—Detachable
110. Wheeled Luggage or Rolling Tool Bag
111. Vertical telescopic support members of luggage and tool bags
112. Luggage or Tool Bag Handle
200. Optional Document Clip
306. Sample lightweight Electronic device
307. Sample Screwdriver shown inside case
308. Sample Wrench shown inside case
309. Sample Document
310. Portable Electronic Device
320. Cell Phone

DETAILED DESCRIPTION OF THE INVENTION

The present invention relates to a portable work station that provides a utility case 10 and work surface that mounts on top of, and, in combination with, the handle 112 of telescopic and non-telescopic support members 11 of wheeled luggage 110, rolling tool bags and hand trucks. This invention provides a portable, mountable utility case 10 for anyone who requires a portable work station. For example, it is suitable for travelers who require a temporary work station to provide a surface to hold food, beverages, operate their computer or personal electronic devices. The apparatus can be used similarly by any mobile field personnel who require a portable, temporary case and work surface.

This apparatus is secured to the handle by means of an integral mechanical clamping device operating within a closed ended cavity receptacle 11 extending upward from the bottom of the portable utility case 10. The universal design of the mechanical clamping device can accommodate handles of varying widths and thicknesses. Due to the universal design, the application of this apparatus is not limited to equipment handles. Additional objects, advantages and novel features will become apparent upon examination of the following and will be learned throughout usage of the invention.

The portable utility case 10 mounts to the top of the handle 112 of the vertical, extensible, telescopic or non-telescopic support members 111 of wheeled luggage 110, rolling tool bags and hand trucks and secured to the handle 112 by means of an integral mechanical clamping device. The universal design of the mechanical clamping device can accommodate handles of varying widths and thicknesses within the closed ended cavity receptacle 11 within the bottom of the utility case 10.

Throughout the following discussion, reference numerals have meaning in the within list.

Figure 1:
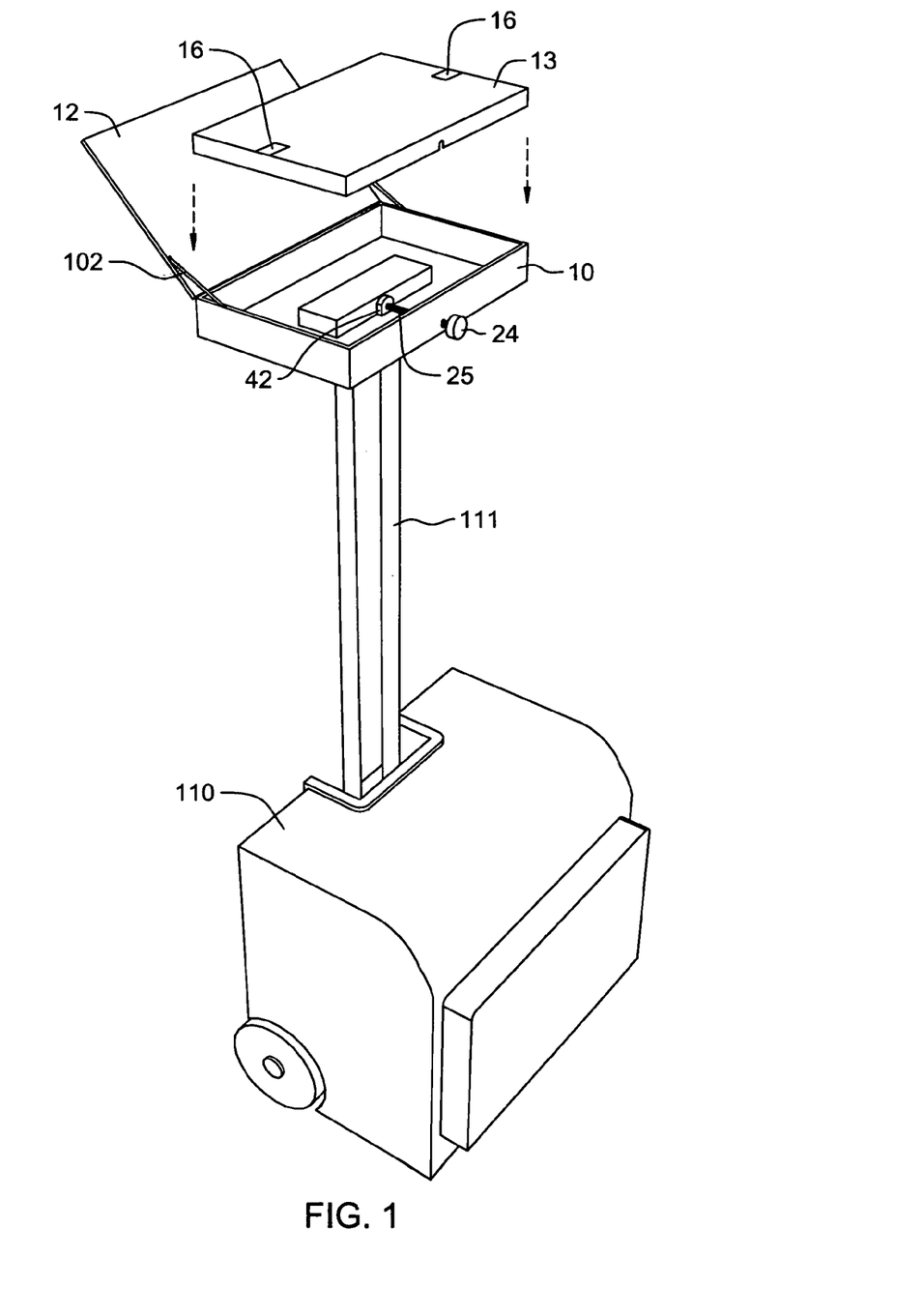
FIG. 1 is a perspective view of an embodiment for a portable work station of the present invention, showing a work station case mounted atop a typical wheeled luggage or tool bag with the work station case cover shown open, and showing an interior work surface removed from the case.

The apparatus is shown in its substantial application in an isometric view as FIG. 1 mounted atop the handle 112 (shown in FIG. 2) supported by vertical support members 111 of wheeled luggage 110 or a rolling tool bag 110. The apparatus can also be mounted atop a small hand truck handle. The apparatus is shown in its uppermost position. The height of the apparatus can be adjusted on vertical, extensible telescopic support members for user preference such as sitting or standing. The tipping moment of the installed apparatus is affected by the height and weight of the apparatus and its contents as well as the weight and distribution of weight in the luggage or bag, frictional resistance of the wheels and other related factors.

Figure 2:
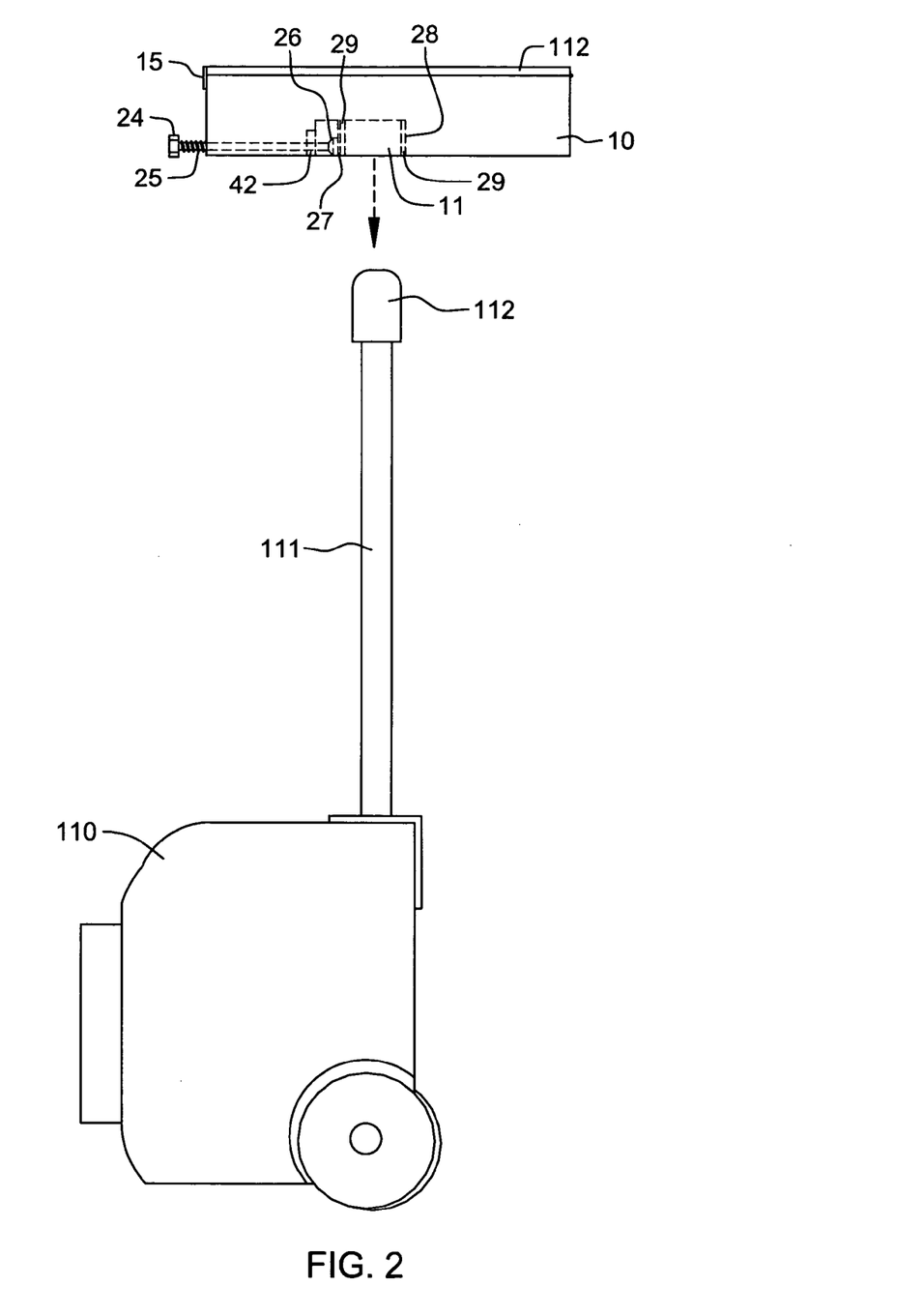
FIG. 2 is a side view of the portable work station of the present invention, showing the work station case prior to mounting atop a typical wheeled luggage or tool bag handle.

As depicted in FIG. 2, a side view shows the apparatus prior to mounting on top of the luggage handle 112 by placing the closed ended cavity 11 of the base tray 10 with clamping Mechanism Cavity 11, over the handle 112 with the moving jaw plate 27 in its substantially open position. The Knob 24, which is rigidly attached to the Threaded Adjustment Screw 25, is rotated to advance the Moving Jaw Plate 27 to apply a clamping force to both sides of the handle 112. This clamping force secures the apparatus to the handle 112.

Figure 3:
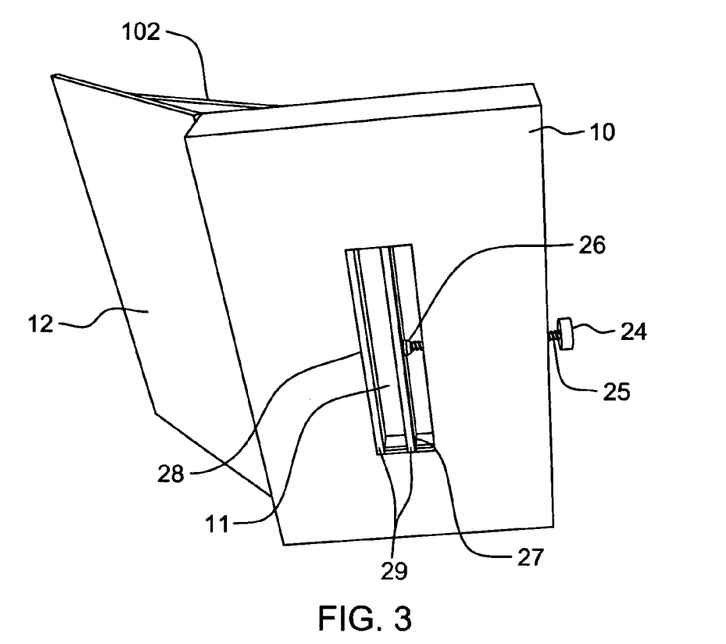
FIG. 3 is a bottom perspective view of the case assembly of the work station case.

A Swivel Head 26 that can provide 3-dimensional movements is rigidly attached to the Moving Jaw Plate 27 of closed ended cavity 11 of tray 10 to accommodate unevenness of the handle 112 to optimize clamping contact with the handle 112. The Non-slip Pads 29 provide frictional resistance on both clamping surfaces to provide compressive force on both sides of the handle 112 between the Moving Jaw Plate 27 and the opposing stationary clamp wall 28 of the cavity 11 clamping surface of the Base Tray 10, with closed ended Clamping Mechanism Cavity 11. The Threaded Insert 42 transmits the opposing force of the threaded adjustment screw 25 to the Base Tray 10 with Clamping Mechanism Cavity 11 that distributes the clamping load through the shell of the case to provide superior strength. FIG. 3 shows a bottom perspective view of the apparatus without hidden item detail.

Figure 4:
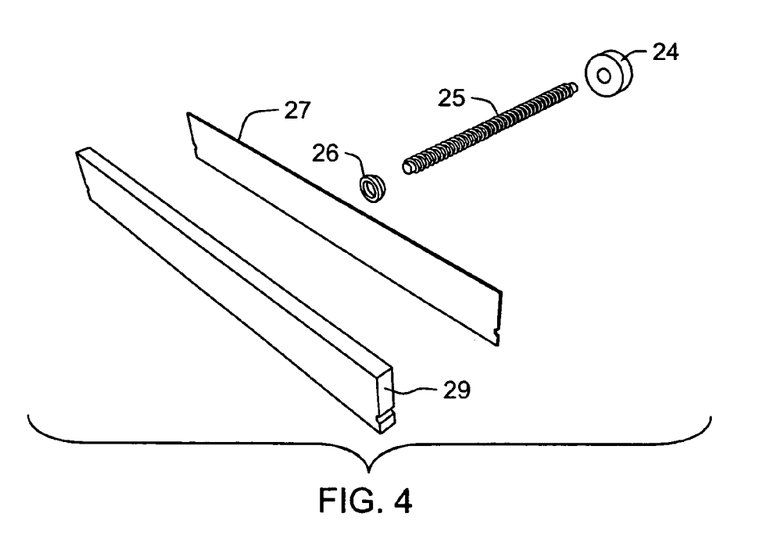
FIG. 4 is an exploded perspective of the clamping mechanism with a movable jaw plate and Non-slip pad.

FIG. 4 is an exploded view, not-to-scale, of the Knob 24, Threaded Adjustment Screw 25, Swivel Head 26, Moving Jaw Plate 27 and Non-slip Pad 29.

Figure 5:
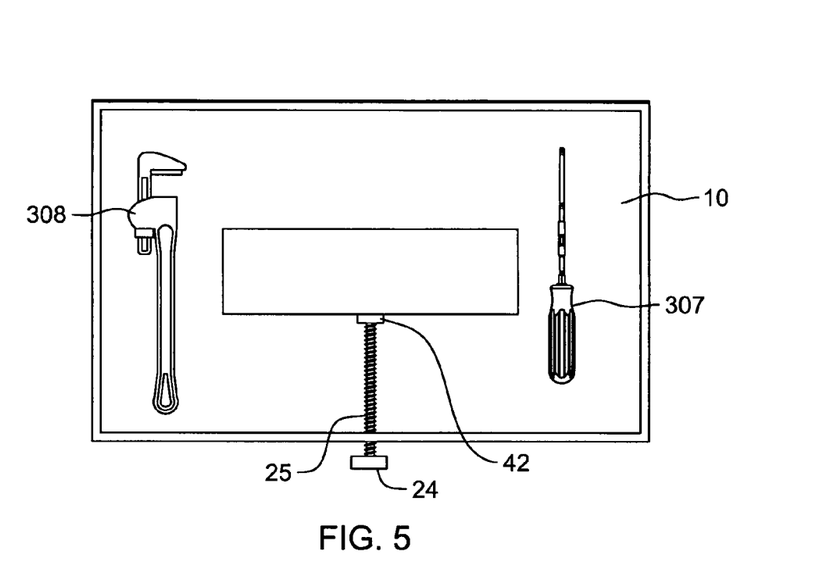
FIG. 5 is a top view of the present invention with both a removable work surface and showing a cover removed, wherein the movable jaw plate, swivel head and non-slip pad of the recess cavity for holding a handle of a mobile device therein, are not shown.

FIG. 5 is a top view, without hidden item detail, of the apparatus with Sample Screwdriver 307 and Sample Wrench 308 shown inside Base Tray 10 with closed ended Clamp Mechanism Cavity 11 with Cover with Hinge 12 removed. FIG. 5 shows Knob 24 rigidly attached to the Threaded Adjustment Screw 25 which passes freely through a non-threaded hole in the front of the Base Tray 10 with closed ended Clamp Mechanism Cavity 11. The Threaded Adjustment Screw 25 is threaded into the Threaded Insert 42 which is rigidly attached to the Base Tray 10 with Clamp Mechanism Cavity 11.

Figure 6:
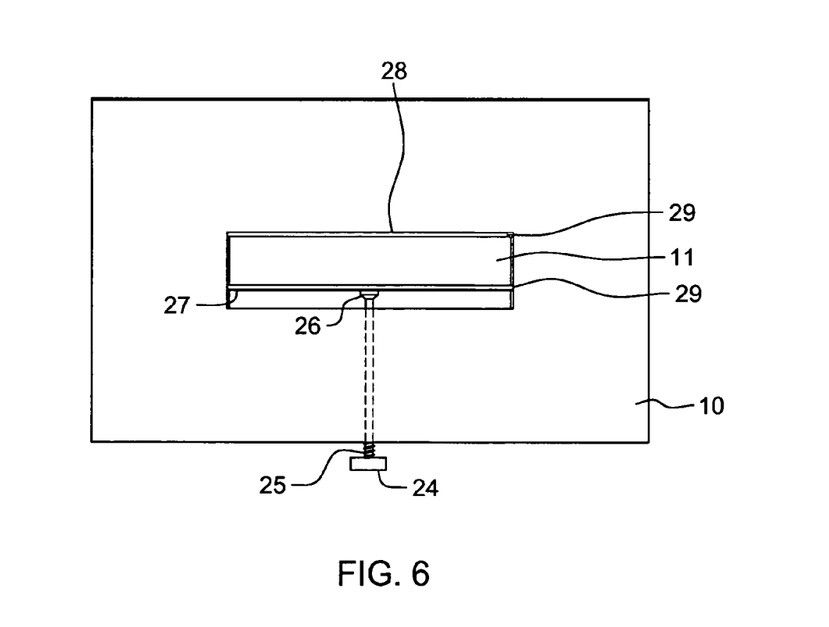
FIG. 6 is a bottom view of present invention with both the removable work surface and cover removed.

FIG. 6 is a bottom view of the Base Tray 10 with closed ended Clamp Mechanism Cavity 11 without hidden item detail. FIG. 6 shows Knob 24 rigidly attached to the Threaded Adjustment Screw 25 which passes freely through a non-threaded hole in the front of the Base Tray 10 with Clamp Mechanism Cavity 11. The Threaded Adjustment Screw 25 is secured to the Swivel Head 26 such that Swivel Head 26 can pivot the Moving Jaw Plate 27 in 3 dimensions to accommodate the unevenness of the handle 112 to optimize clamping contact with the handle 112. The Moving Jaw Plate 27 is constrained from pivoting outside the Clamp Mechanism Cavity by the tight dimensional tolerance of the clamp mechanism cavity walls with the Moving Jaw Plate 27 and stationary clamp wall 28. For added strength, the Moving Jaw Plate 27 can be constructed with an angle iron design to increase rigidity and minimize flexing. The Non-slip Pads 29 provide frictional resistance and grip to the Luggage or Tool Bag Handle 12.

Figure 7:
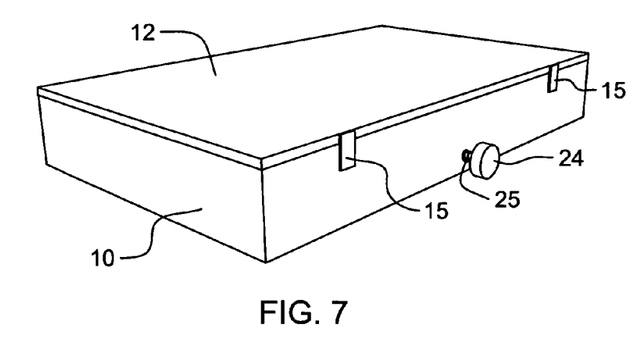
FIG. 7 is a perspective view of the work station case, showing its exterior configuration only; and wherein internal items are not shown.

FIG. 7 shows an external perspective view, without any hidden item views, of the Base Tray 10 with closed ended Clamp Mechanism Cavity 11. The optional, removable Cover with Hinge 12 provides a case as well as an external work surface. The apparatus can be used as a self-contained case with Latch-Velcro or mechanical fastener 15 to secure the case closed and an optional carrying strap or handle. A strap can also be attached to the apparatus that can be slid over the vertical, extensible telescopic support members of the Wheeled Luggage and Rolling Tool Bags 111 to rest on top of the Luggage, Tool Bag or Hand Truck 110 for transport. The external Knob 24, which is rigidly attached to the Threaded Adjustment Screw 25, can be rotated to engage or disengage the Moving Jaw Plate 27 and stationary clamp wall 28 of the Luggage or Tool Bag Handle 112.

Figure 8:
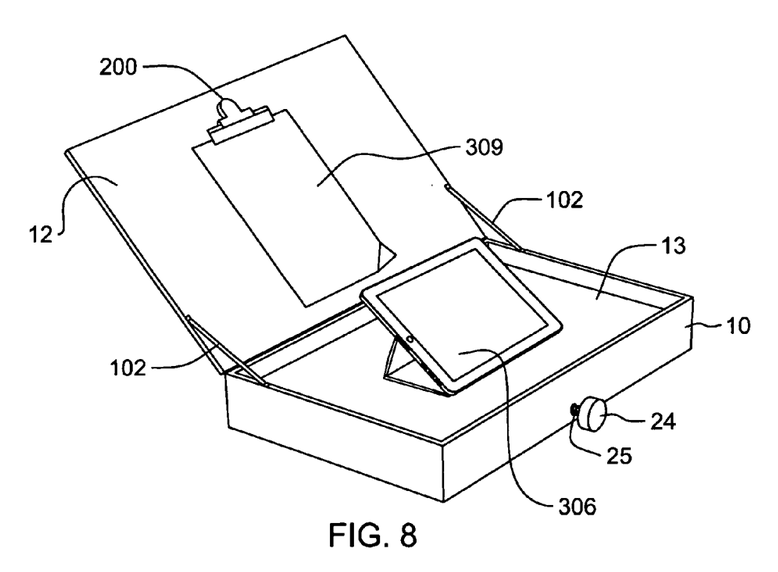
FIG. 8 is an external, perspective view of a work station case of the present invention, shown with an open cover and a removable work surface; and wherein internal items are not shown, and further wherein a sample clip board and small electronic device are shown for example only.

FIG. 8 is an isometric view of the apparatus, without any hidden item views, of the Base Tray 10 with Clamp Mechanism Cavity 11 optional Cover with Hinge 12 shown in the open position. The apparatus is shown with Optional Document Clip 200, with an example of sample personal effects of a Sample Document 309 and Sample Lightweight Electronic device 306.

The preferred clamping mechanism cavity location is equally centered in the Base Tray but alternate locations can be used. For example, the clamping mechanism cavity can be shifted to the rear of the Base Tray depending on the need. The rear of the Base Tray is located at the hinge.

The Base Tray 10 with Clamping Mechanism Cavity 11 can also be constructed from U-channel which is integral to the Base Tray 10 with Clamp Mechanism Cavity 11. The ends of the channel can be closed to provide additional structural integrity to prevent the channel from spreading open.

The Base Tray 10 with Clamping Mechanism Cavity 11 can also be provided with a tray Cover with Hinge 12. An optional Cover Restraint 102 maintains the Cover with Hinge 12 in an upright position when the cover is open to view documents 309 with Optional Document Clip 200 or to view small electronic devices 306 and similar to work hands-free. An optional Removable Interior Work Surface 13 can be inserted into the Base Tray 10 with Clamping Mechanism Cavity 11 to provide an interior work surface. This Removable Interior Work Surface 13 also acts a cover for the items stored below such as a Wrench 308 and Screw Driver 307 in the base tray and can be removed with Interior Work Surface Removal Tabs 16.

Figure 9:
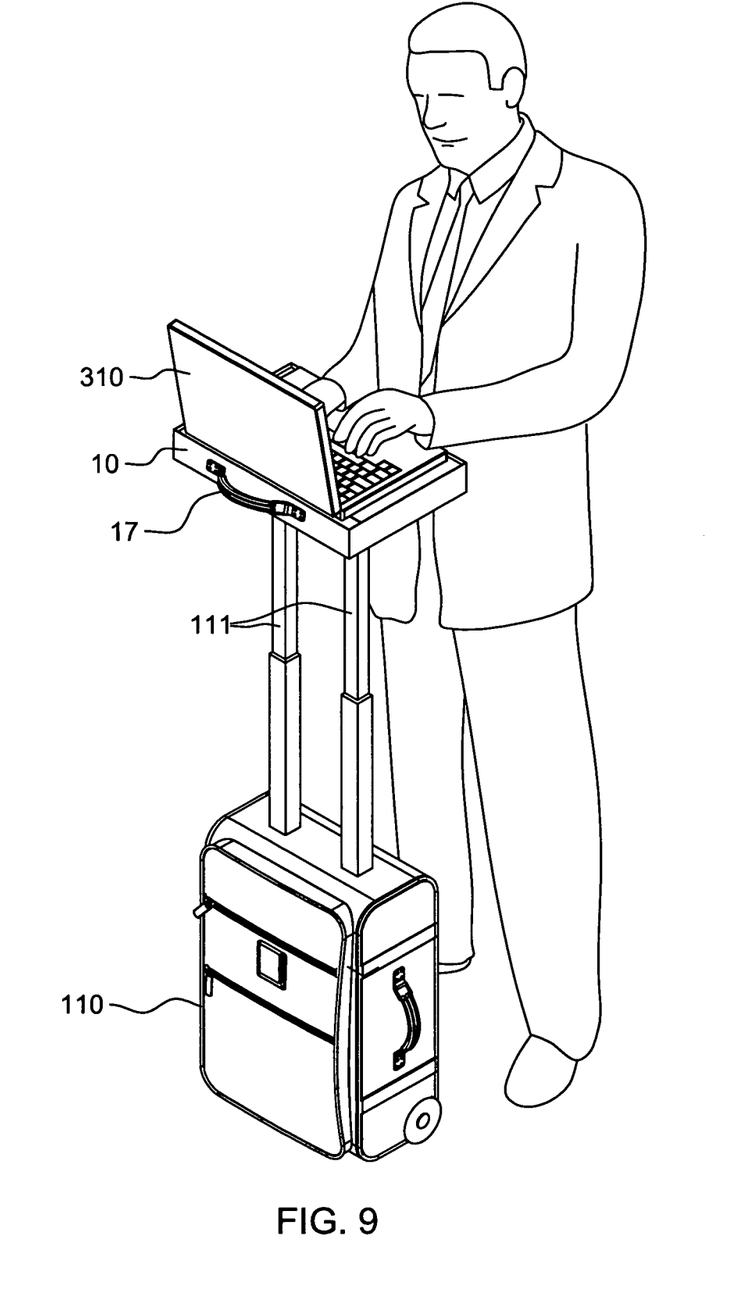
FIG. 9 is a perspective view of the portable work station of the present invention in use, show with a laptop computer and with a user thereof standing.

FIG. 9 shows base tray utility case 10 of the present invention in use with portable electronic device 310, such as a laptop computer, with a user standing. Utility case 10 has a closed ended recess cavity 11 (such as shown in FIGS. 2, 3 and 6 herein,) within which recess cavity is inserted handle 112 of telescopic handle supports 111, shown in FIG. 2.

Figure 10:
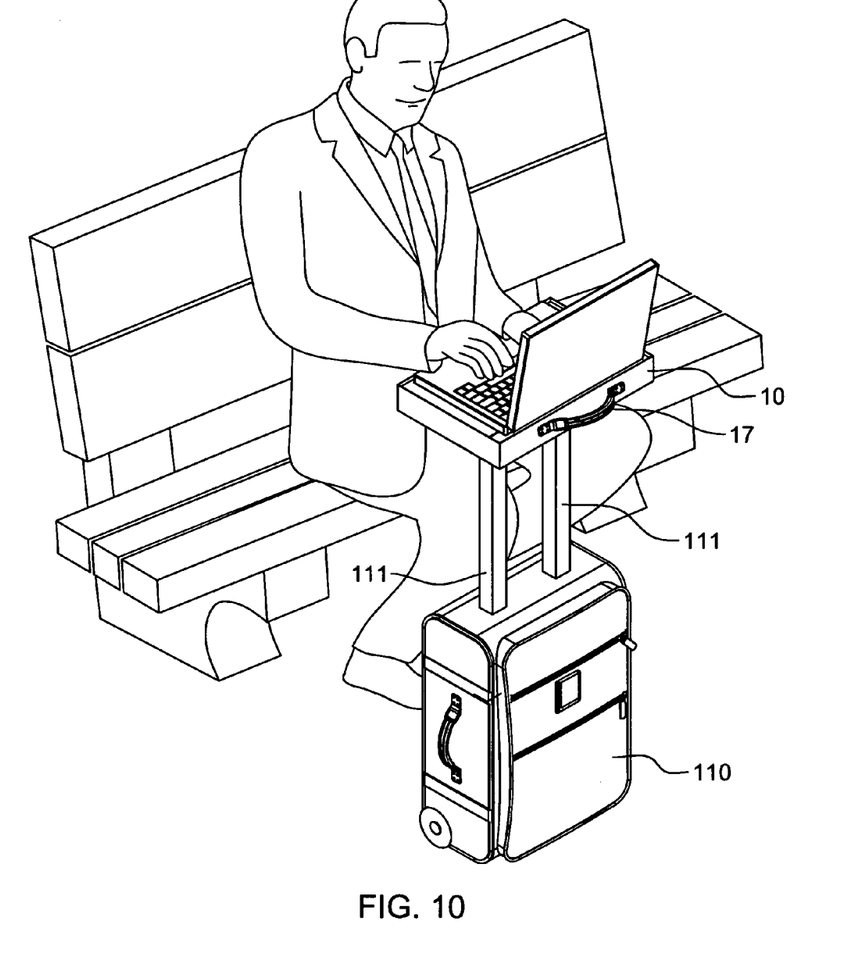
FIG. 10 is a perspective view of the portable work station of the present invention with a laptop computer user shown sitting, and wherein the mobile device supporting the work station case is shown with a telescopic handle in a lowered position.

FIG. 10 shows base tray utility case 10 with an optional carry handle 17, with the user sitting, with a telescopic handle supports 111 in a lowered position.

Figure 11:
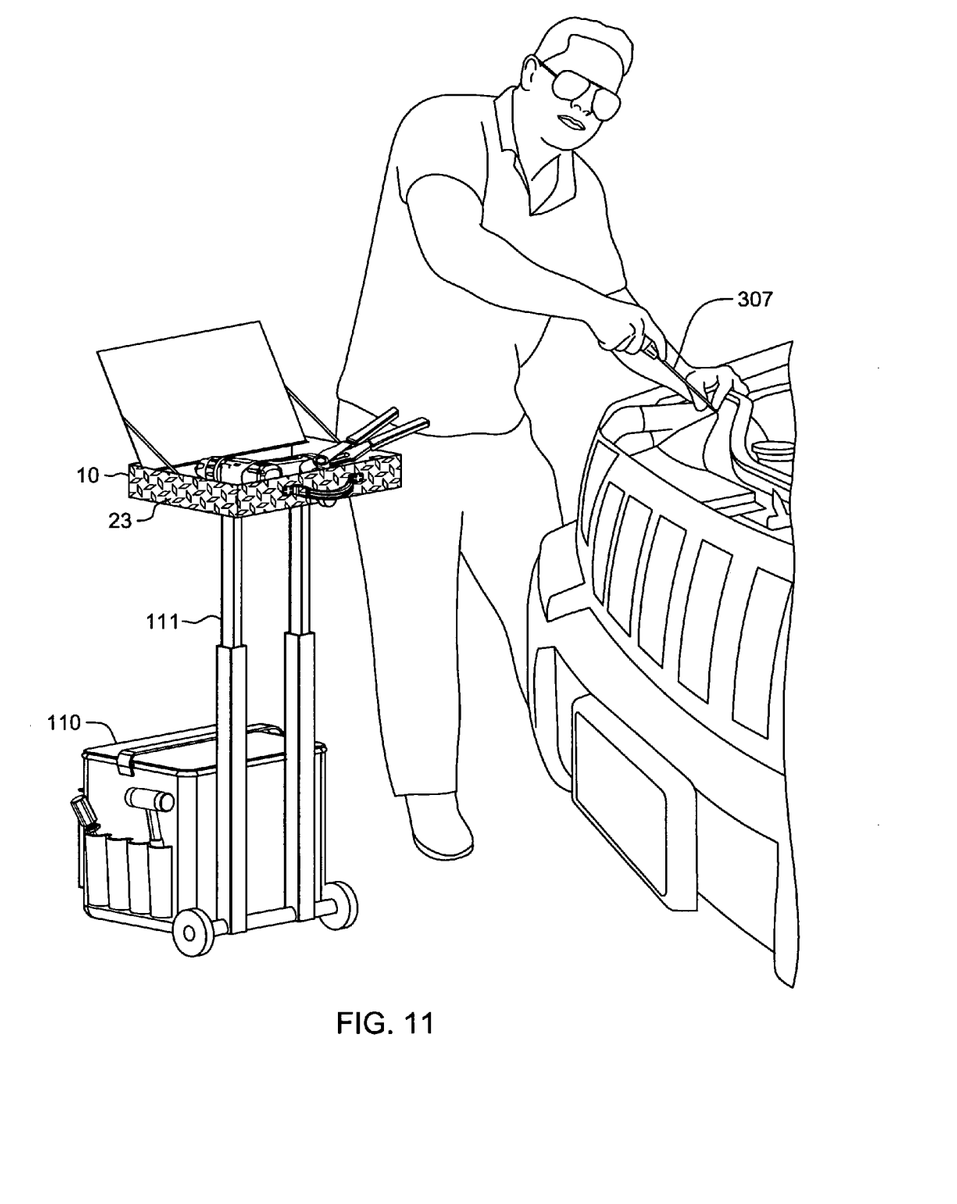
FIG. 11 is a perspective view of a technician using a portable work station of the present invention, as a portable work station with tools and parts.

FIG. 11 shows a technician using the utility case 10 present invention as a portable workstation with tools and parts, including screwdriver 307, wherein the utility case 10 has a hard cover 23, such as, for example, a diamond plate cover.

Figure 12:
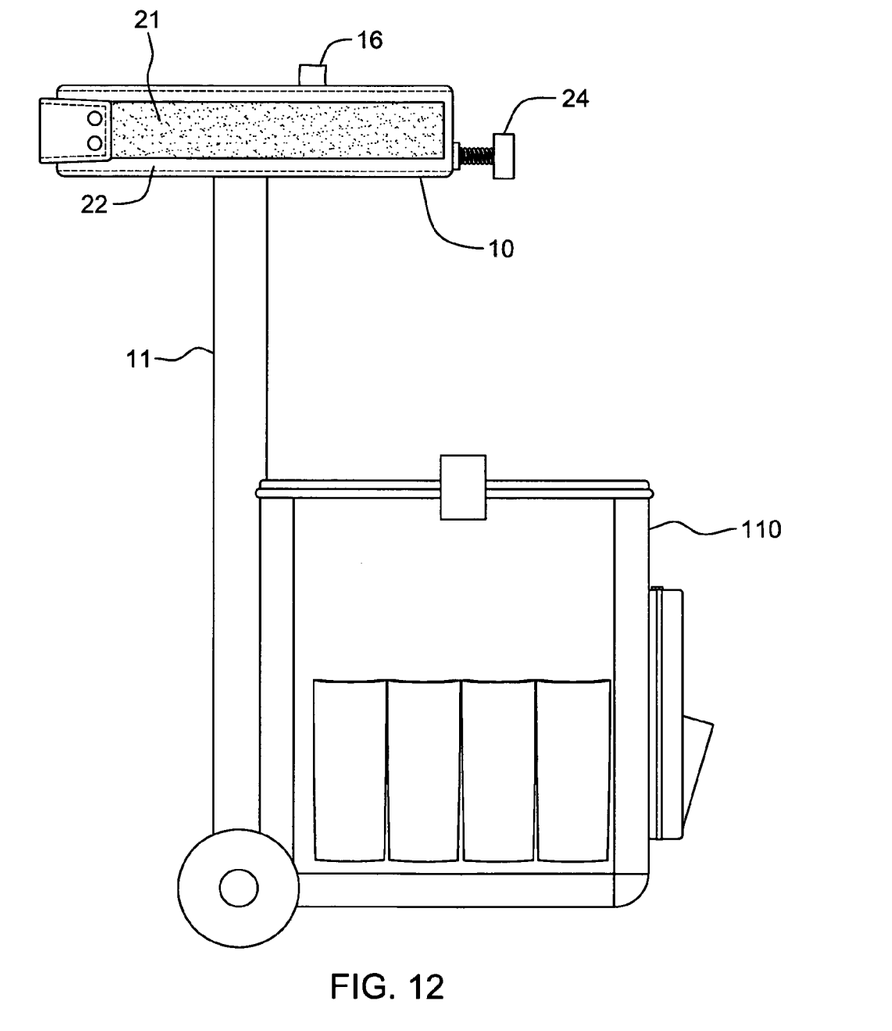
FIG. 12 is a perspective view of an alternate embodiment of the present invention shown in lower use position on a rolling tool bag.

FIG. 12 shows utility case 10 in a lower use position, on a rolling tool bag 110, with telescopic handles supports 111. Latch 24 is shown as in FIGS. 1-8 to tighten movable jaw plate 27, to hold handle 112 within closed ended recess cavity 11.

Figure 13:
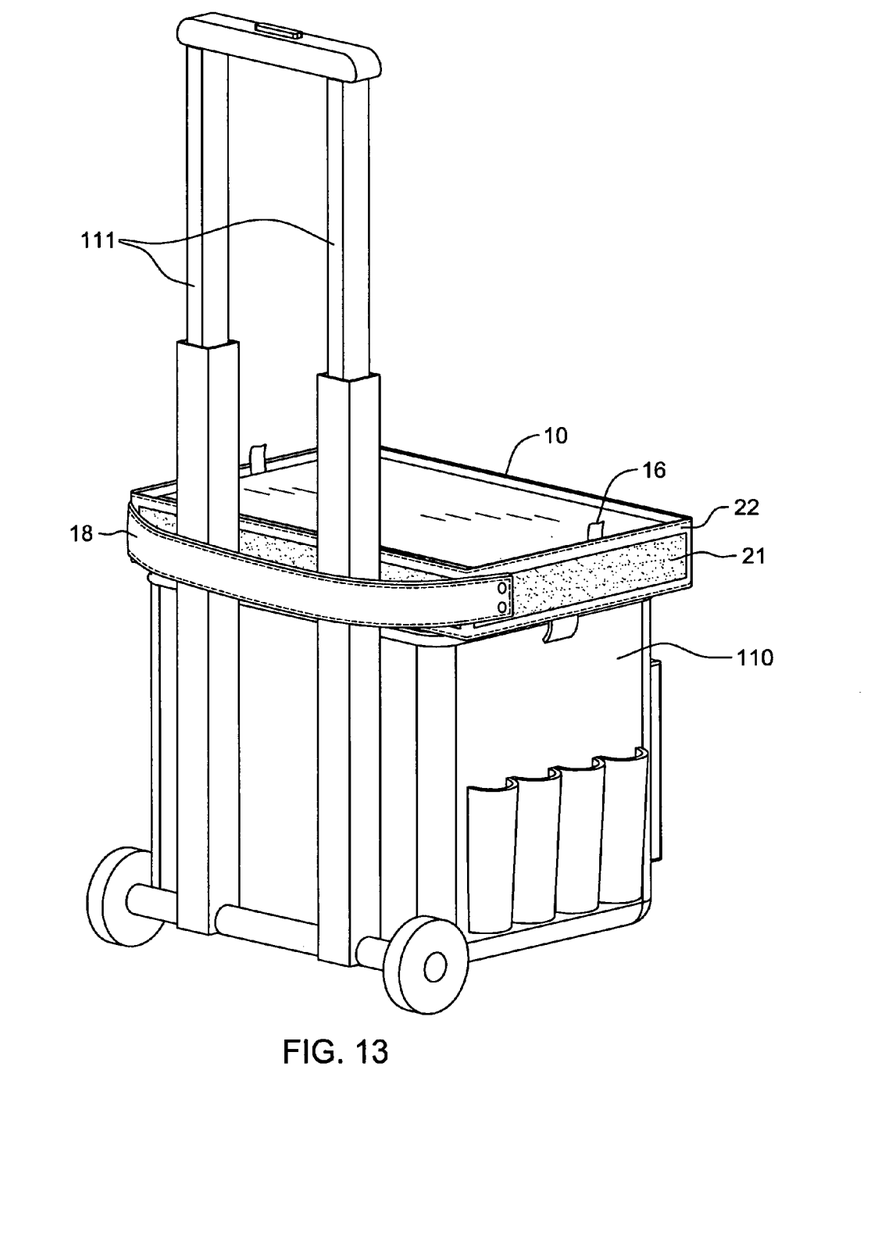
FIG. 13 is a perspective view of the present invention shown in travel position lowered atop a rolling tool bag.

FIG. 13 shows utility tray 10 of the present invention, wherein it is shown in a travel storage position, lowered atop a rolling tool bag 110, and being secured from falling by restraining strap 18. Utility tray 10 is covered in an optional soft exterior cover, having optional linear edge cushions 22.

Figure 14:
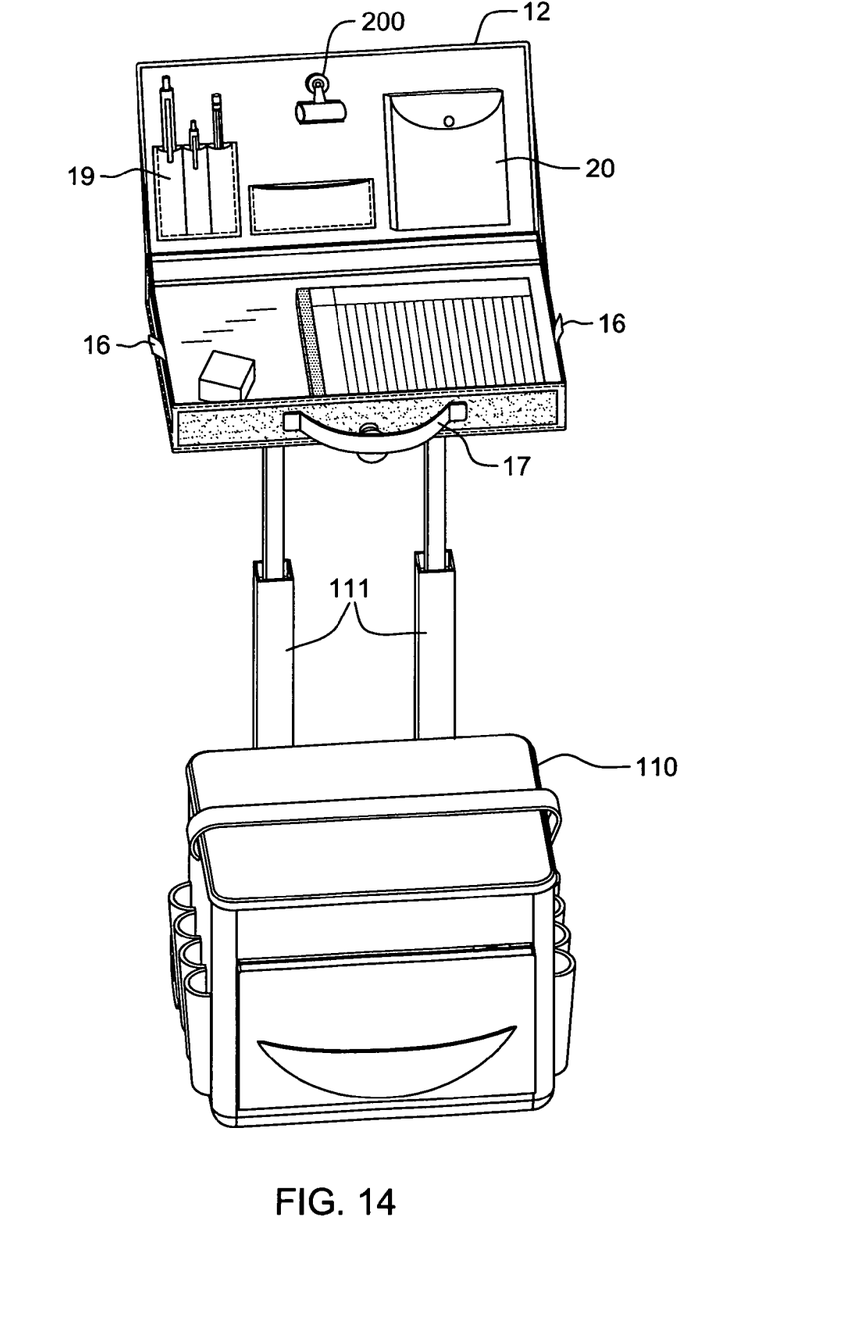
FIG. 14 is a perspective view of the portable work station of the present invention, shown as a portable office in a working position.

FIG. 14 shows utility case 10 as a portable office in a working position, including carry handle 17, implement holding sleeves 19 for implements such as marking instruments, pencils and pens, as well as sub compartment storage unit 20, and optional document clip 200. Carry handle 17 can alternately be used as a restraining strap to slide over telescopic support members 111.

Figure 15:
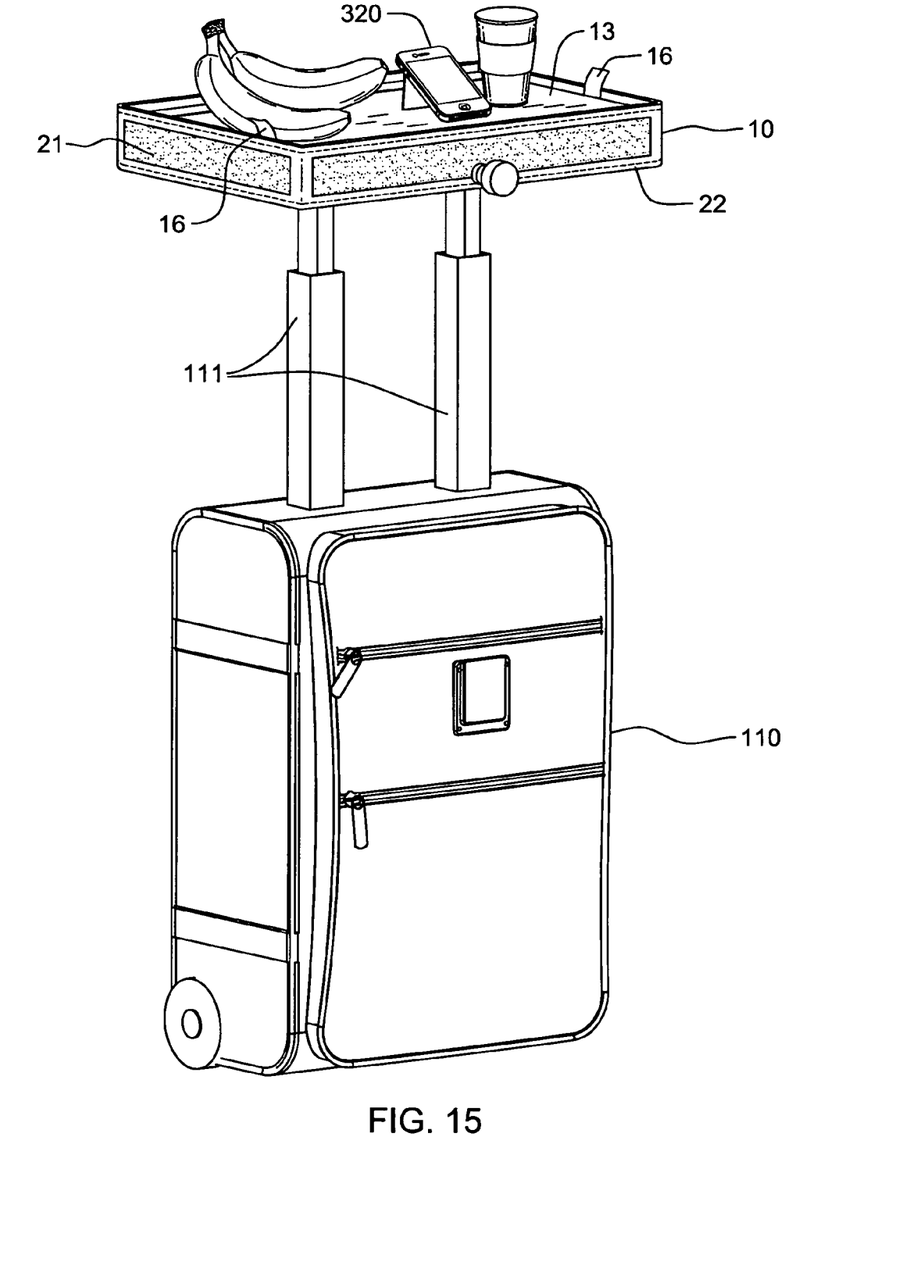
FIG. 15 is a perspective view of the portable work station of the present invention, shown on a wheeled luggage with food, drink and cell phone.

FIG. 15 shows utility case 10 on wheeled luggage with food, drink and cell phone on removable interior work surface 13, having lift tabs 16. Utility case 10 is covered by optional soft exterior cover 21 with optional linear edge cushions 22.

The apparatus material can consist of plastics such as a thermoset or thermoplastic, metal, wood, and any combination thereof. Optional waterproof and water resistant design can provide enhanced benefits for protecting personal items.

The tray cover 12, or other exterior surfaces of base tray utility case 10, can be covered with PV cells (not shown) to charge personal electronics, such as tablet 306 shown in FIG. 8 or cell phone 320 shown in FIG. 15, via connecting cables or other charging surfaces.

CONCLUSION, RAMIFICATIONS AND SCOPE

As the reader can see, the present invention is designed and constructed to provide a working prototype of a unique, removable case and work surface that attaches to wheeled luggage and rolling tool cart having extensible, telescopic supports and a handle on top. In accordance with the spirit of this invention, this invention can similarly be used on non-telescopic applications or any application that benefits from this design.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention. It is further known that other modifications may be made to the present invention, without departing the scope of the invention.

We claim:

1. A portable work station comprising in combination:
   a mobile device having at least one upwardly extensible member with a horizontally extending handle member at a top end thereof for directing and controlling movement of said mobile device;
   a work station case adapted to be used in combination with the mobile device, said work station case comprising a housing with an interior formed by a flat bottom, side walls and a cover adapted to be opened, said cover when closed forming an outer work surface;
   a receptacle within said interior;
   said flat bottom having an opening in communication with said receptacle and adapted to receive said handle member when said work station case is deployed on said extensible member, said work station case being removable from said handle member and said extensible member for storage or transport; and
   an apparatus for clamping said handle member within said receptacle for allowing said work station case to be employed while mounted on said extensible member.

2. The portable work station combination of claim 1 in which said receptacle comprises a stationary clamp wall spaced from a movable jaw plate, said handle member being clamped between said stationary clamp and movable jaw plate during deployment on said extensible member for use.

3. The portable work station combination of claim 2 in which said clamping apparatus comprises a threaded adjustment screw having one end thereof connected to said movable jaw plate and an opposite end thereof having an adjustment knob, said adjustment screw being threaded through a side wall of said housing for clamping said handle member within said receptacle.

4. The portable work station combination of claim 3 in which said housing has a removable false bottom covering said receptacle, whereby an upper side of said false bottom forms an interior work surface for a computer or similar device.

5. The portable work station of combination claim 4 in which said cover is hinged with a detachable restraint to allow an inner surface of said cover when opened to form an additional work surface.

6. The portable work station combination of claim 4 in which said mobile device comprises luggage with wheels, said extensible member being retractable into said luggage.

7. The portable work station combination of claim 4 in which said mobile device comprises a tool box with wheels, said extensible member being retractable into said tool box, whereby deployment of said work station on said handle member allows a user to have frequently used tools within said work station for easier access.

8. The portable work station of claim 1 wherein said housing of said work station case includes a soft exterior cover.

9. The portable work station of claim 4 wherein said interior work surface is removable from said housing of said work station case.

10. The portable work station of claim 4 further comprising a restraining strap restraining said work station case from falling off of said mobile device when said work station case is not supported on top of said handle of said extensible, telescopic support members of said mobile device.

11. The portable work station of claim 10 wherein said restraining strap acts as a carry handle to carry said work station case manually by hand.

12. The portable work station of claim 1 further comprising at least one implement holding sleeve located within said housing of said work station case.

13. The portable work station of claim 1 further comprising at least one sub-compartment storage unit located within said housing of said work station case.

14. The portable work station of claim 1 further comprising at least one power source for a portable hand held electronic device located within said housing of said work station case.

15. The portable work station of claim 1 wherein said housing of said work station case contains a flat exterior surface acting as a work surface supporting a personal electronic device thereon when said work station case is in a closed position upon said handle of said at least one upwardly extending extensible member.

16. The portable work station of claim 1 further comprising at least one implement holding sleeve within said housing of said work station case.

17. A method of forming and using a portable work station comprising the steps of:
   using a horizontally extending handle member located at a top end of a member extending from a mobile device for directing and controlling movement of said mobile device;
   mounting a work station on said handle member when said member is extended, said work station comprising a housing with an interior formed by a flat bottom, side walls and a cover adapted to be opened, said cover when closed forming an outer work surface, a receptacle within said interior, and said flat bottom having an opening in communication with said receptacle said receptacle receiving said handle member when said work station is deployed on said extensible member;
   clamping said handle member within said receptacle for allowing said work station to be employed while mounted on said extensible member; and removing said work station from said handle member and retracting said extensible member for storage or transport of said work station and/or said mobile device.

18. The method of claim 17 further comprising the step of providing a false bottom within the housing above and covering the cavity receptacle, whereby an upper side of the false bottom forms an interior work surface for a computer or similar device.

19. The method of claim 18 in which said cover is hinged with a detachable restraint to allow an inner surface of said cover when opened to form an additional work surface.

* * * * *